(12) United States Patent
Thompson (10) Patent No.: US 7,950,884 B2
(45) Date of Patent: May 31, 2011

(54) CARGO RESTRAINING APPARATUS

(76) Inventor: Fred Thompson, Columbia, SC (US)

( * ) Notice: Subject to any disclaimer, the term of this patent is extended or adjusted under 35 U.S.C. 154(b) by 713 days.

(21) Appl. No.: 11/851,057

(22) Filed: Sep. 6, 2007

(65) Prior Publication Data

US 2009/0067946 A1 Mar. 12, 2009

(51) Int. Cl.
*B61D 45/00* (2006.01)

(52) U.S. Cl. ........................................... 410/118

(58) Field of Classification Search ............... 410/117, 410/118, 97, 100, 129, 142; 224/42.33, 42.34; 296/37.5, 37.6, 37.8, 24.4; 160/135, 351
See application file for complete search history.

(56) References Cited

U.S. PATENT DOCUMENTS

| | | | |
|---|---|---|---|
| 2,155,463 A | 4/1939 | Angell | 105/376 |
| 2,188,846 A | 1/1940 | Rueb | 192/43.1 |
| 2,286,917 A | 6/1942 | Mandl | 192/43.2 |
| 2,517,823 A | 8/1950 | Angell | 105/376 |
| 3,017,843 A | 1/1962 | Loomis et al. | 105/376 |
| 3,029,747 A | 4/1962 | Shaver | 105/376 |
| 3,063,388 A | 11/1962 | Magarian et al. | 105/376 |
| 3,073,261 A | 1/1963 | Oglesby | 105/376 |
| 3,144,839 A | 8/1964 | Palsson | 105/376 |
| 3,162,146 A | 12/1964 | Knippel et al. | 105/376 |
| 3,176,629 A | 4/1965 | Shaver | 105/376 |
| 3,209,707 A | 10/1965 | Erickson et al. | 105/376 |
| 3,215,092 A | 11/1965 | Knippel | 105/376 |
| 3,217,664 A | 11/1965 | Aquino et al. | 105/376 |
| 3,233,481 A | 2/1966 | Bacon | 81/63 |
| 3,336,880 A | 8/1967 | Johnston | 105/376 |
| 3,767,253 A | 10/1973 | Kluetsch | 296/24 |
| 4,147,076 A | 4/1979 | Wright et al. | 81/63.2 |
| 4,185,360 A | 1/1980 | Prete, Jr. et al. | 24/68 |
| 4,264,251 A | 4/1981 | Blatt | 410/100 |
| 5,207,260 A | 5/1993 | Commesso | 160/135 |
| 5,271,606 A | 12/1993 | Kamper | 254/217 |
| 6,007,283 A | 12/1999 | Labeur | 410/97 |
| 6,030,158 A | 2/2000 | Tatina et al. | 410/100 |
| 6,183,177 B1 | 2/2001 | Dahlgren | 410/100 |
| 6,247,740 B1 | 6/2001 | Smith | 296/24.1 |
| 6,406,232 B1 * | 6/2002 | Snitker et al. | 410/142 |
| 6,461,090 B1 * | 10/2002 | Faber et al. | 410/100 |
| 6,616,389 B1 * | 9/2003 | Ament et al. | 410/118 |
| 6,715,973 B2 * | 4/2004 | Faber et al. | 410/100 |
| 6,749,241 B1 * | 6/2004 | Erlandsson et al. | 296/24.4 |
| 6,948,896 B2 | 9/2005 | Zhan et al. | 410/117 |
| 7,393,034 B2 * | 7/2008 | Brussard et al. | 296/24.41 |

* cited by examiner

*Primary Examiner* — Hilary Gutman
(74) *Attorney, Agent, or Firm* — John B. Hardaway, III; Nexsen Pruet, LLC (57) ABSTRACT

A load restraining apparatus includes a retractable fabric membrane for retaining items in position inside a semi-trailer or shipping container. A membrane carrier is removably fastened to one interior wall of the trailer and a spring-biased retractable membrane is pulled across the width of the trailer and fastened to the other interior wall. A tensioning device tensions the membrane thereby securing the cargo during shipment and preventing shifting inside the shipping container or trailer. The fore and aft adjustability and the vertical adjustability of the load restraining apparatus permit it to effectively restrain cargo of diverse size and shape.

10 Claims, 10 Drawing Sheets

CARGO RESTRAINING APPARATUS

BACKGROUND OF THE INVENTION

The current invention relates to apparatuses useful in restraining items of commerce and the like transported in semi-trailer trucks. Inadequately restrained cargo in the transport vehicles can cause damage to the transported cargo items and can result in injury to workers unloading the cargo. Load locks, or load restraining devices, such as expandable bar load locks and straps, lack the adjustability necessary to snug or firmly restrain stacked cargo against displacement during transport. Straps and bars also do not adequately restrain small articles or packages when these articles are stacked inside the semi-trailer. Larger load locks that provide the ability to restrain loose items are not able to snugly fit and conform to the articles restrained, are cumbersome to put in place, take up usable cargo space when not needed, and are incapable of vertically restraining articles.

BRIEF SUMMARY OF THE INVENTION

The object of this invention is to provide a quick and secure means of vertically and or horizontally restraining loose and bulk articles within a container such as a shipping container or semi-trailer. More specifically, the invention enables a user to releasably fasten one end of a fabric membrane tensioning carrier to one semi-trailer interior side wall, releasably fasten the membrane tensioning carrier to the other semi-trailer side wall and then tension the membrane such that the membrane abuts and restrains the articles within a section of the trailer.

The cargo restraining apparatus includes a carrier with a spool, biased by a tensioning mechanism and an inelastic flexible fabric membrane having one end attached to the spool. A grab bar is attached to the other end of the fabric membrane. Clips are connected to the grab bar and to the membrane tensioning carrier, or to the grab bar and a mounting bracket that is vertically-translatably and horizontally-rotatably connected to the membrane tensioning carrier. The tensioning mechanism of the membrane carrier is retractably biased so as to rotatably retract and coil the membrane around a spool which is rotatably supported by the carrier. A ratcheting lever and latching pawl in conjunction with a ratchet wheel connected to the spooling rod enables the tensioning of the membrane and locking the membrane in its tension position.

To use the load lock apparatus, a user releasably mounts the apparatus to one side wall of a semi-trailer. This may be achieved by engaging the clips in apertures formed in mounting brackets, such as e-channels, commonly provided in interior side walls of semi-trailers. The user then fully opens the ratcheting lever, thereby disengaging the latching pawl, pulls the restraining membrane across the trailer, and releasably fastens it to the other side wall of the trailer. Ideally, the membrane will be abutting the articles to be restrained.

A preferred embodiment of the invention includes a mounting bracket that permits vertical translation and rotation of the carrier about a transverse horizontal axis. Vertical translation of the carrier enables the membrane to restrain articles positioned low in the trailer, or alternatively enables the membrane to restrain articles positioned high in the trailer. Two load restraining assemblies may be used, one high, the other low, to restrain articles stacked the full height of the trailer. Another embodiment of the load restraining device possesses a vertical height that spans the entire height of the trailer. A ratcheting lever for tightening the membrane may be positioned on top of the carrier, or the carrier may be mounted in an inverted position with the ratcheting lever positioned on the bottom.

The load restraining apparatus places the membrane as close as possible to the articles to be restrained. This is achieved by using a left or right hand version of the apparatus, or by mounting the carrier in an inverted position. When the load restraining device is used in a semi-trailer having vertical e-channels, horizontal adapter brackets with horizontally spaced vertical connection slots may be releasably attached to the e-channels which allow fore and aft adjustment of the position of the membrane, thereby providing a close fit of the membrane to the articles to be restrained. The carrier may be connected to an interior side wall of the semi-trailer by an adapter affording vertical position adjustment and pivotal movement about a horizontal transverse axis and the distal end of the membrane may be connected to the opposite semi-trailer side wall by a centrally positioned clip on a grab bar on the distal end of the membrane.

BRIEF DESCRIPTION OF THE DRAWINGS

The invention is illustrated by the accompanying drawings, in which.

DETAILED DESCRIPTION OF THE INVENTION

Figure 1:
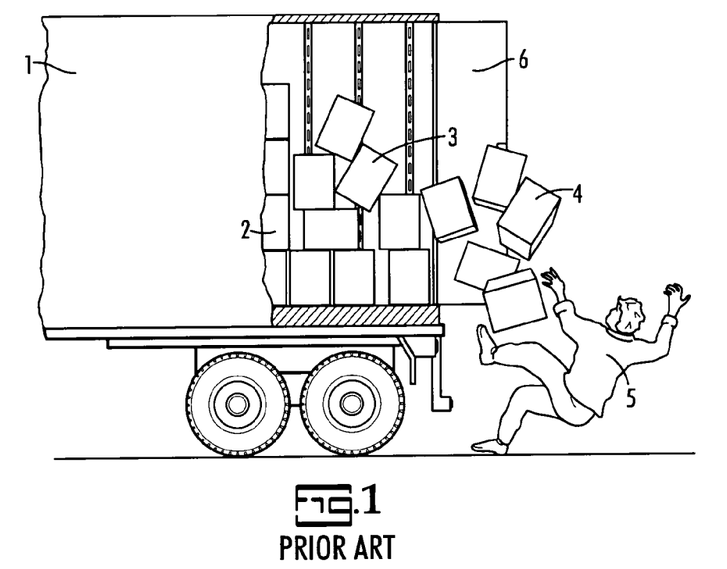
FIG. 1 is an lateral partial-cutaway prior art view showing loose articles that have been inadequately restrained and present a fall hazard to an individual opening the rear doors of a semi-trailer.
Figure 2:
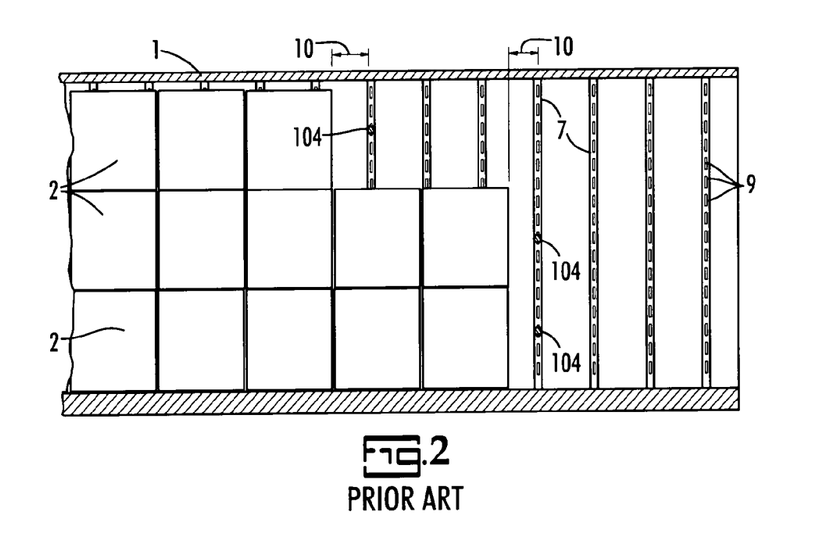
FIG. 2 is a cutaway lateral view of a typical prior art semi-trailer with vertically oriented e-channels to which transverse cargo restraining components are mounted.
Figure 3:
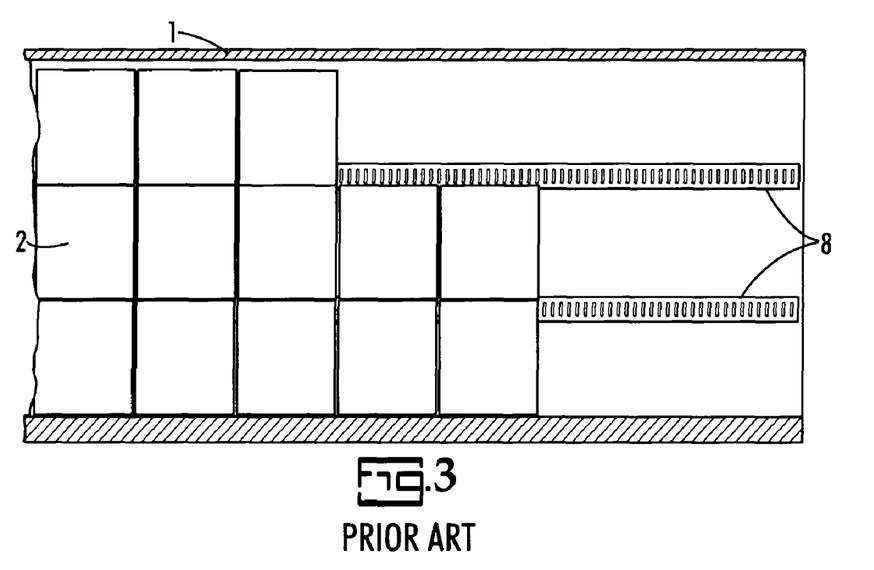
FIG. 3 is an interior side view of a prior art semi-trailer with horizontally oriented e-channel mounting strips.

Current shipping practices, such as just in time delivery, require goods to be shipped in containers, both in bulk palletized form and also as loose packages placed within a larger container, such as a truck, shipping container, or, as illustrated in FIG. 1, a semi-trailer 1. Carefully stacked packages 2, may shift during transit, such as packages 3. Shifting merchandise not only increases transit costs due to damaged goods, but also presents a fall hazard 4 to unsuspecting personnel 5 opening the doors 6 to the semi-trailer 1. FIGS. 2 and 3 are a cutaway views of a typical prior art semi-trailer 1. Current semi-trailers possess vertical brackets 7 or horizontal brackets 8 possessing a series of elongated rectangular apertures 9 to which straps or rods may be releasably affixed. These brackets 7, 8 are commonly referred to as e-channel brackets or simply e-channels. Vertical e-channels 7 possess an advantage of allowing numerous vertical placement positions; but, as shown in FIG. 2, allow horizontal gaps 10 between transverse restraining rods 104 and the packages 2. Horizontal e-channels 8 possess the inverse advantages and disadvantages.

FIGS. 4 through 15 of the drawings illustrate load restraining apparatus that enables a user to quickly releasably fasten the membrane carrier 12 to one semi-trailer interior wall, releasably fasten the distal end of the membrane 11 to the opposite semi-trailer wall and then tension the membrane 11 so that the membrane abuts and contains articles within a section of the trailer.

Figure 4:
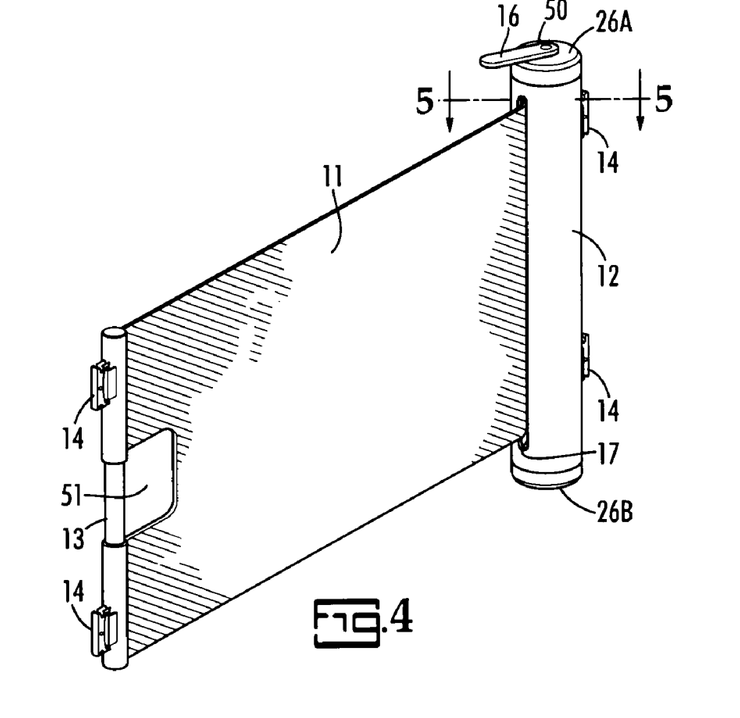
FIG. 4 is a perspective of the membrane and carrier of the invention with the membrane in an extended position.
Figure 5:
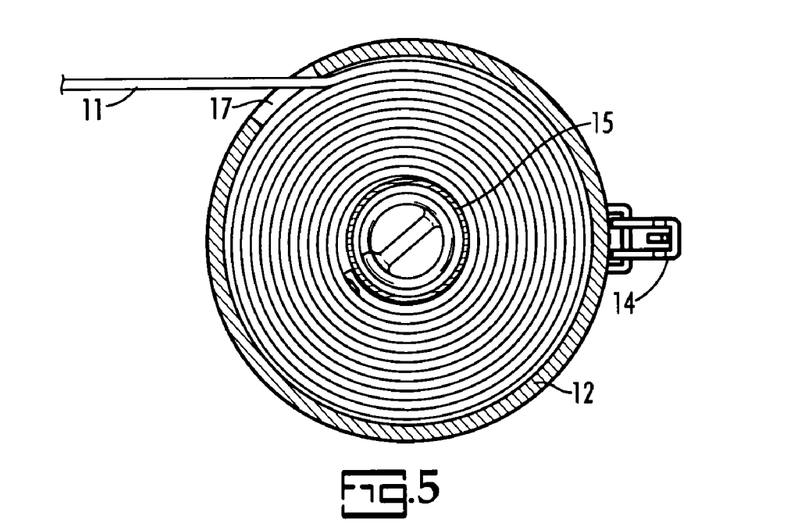
FIG. 5 is a cross section view of the carrier with the membrane in a retracted position.

The embodiment of the invention shown in FIG. 4, shows a cargo restraining apparatus which includes an inelastic fabric membrane 11 between 0.2 and 3.1 meters wide and of sufficient length to extend the width of standard semi-trailer or applicable shipping container. The proximal end of the membrane 11 is attached to a spool 15 which is retractably biased by a tensioning mechanism 50 on a membrane carrier 12 having a ratching or tensioning lever 16. End plates 26A and 26B together with the cylindrical part of the carrier 12 constitute a support frame rotatably supporting the spool 15. A rod or grab bar 13 is attached to the distal end of the fabric membrane 11. An aperature 51 is provided at the distal end of the membrane 11 inermediate the upper and lower side edges of the membrane 11 to facilitate hand gripping the grab bar 13. A pair of vertically spaced clips 14 are connected to the grab bar 13 and a second pair of vertically spaced clips 14 are connected to the carrier 12. The clips 14 are adapted to releasable fasten to vertically elongated openings in the e-channels. The clips 14 attached to the carrier 12 and the rod 13 are aligned vertically and spaced to engage slots in either a vertical e-channel or a horizontal e-channel. The proximal end of the membrane 11 is securely fastened to and spooled around a spool 15 which is rotatably mounted in opposite ends of a housing 12A of the carrier 12. A vertical slot 17 in the housing 12A, provided for the ingress and egress of the membrane 11, is positioned approximately 135 degrees from the clips 14 secured to the housing 12A so as to minimize the space between the articles 2 to be restrained and the membrane 11.

Figure 6:
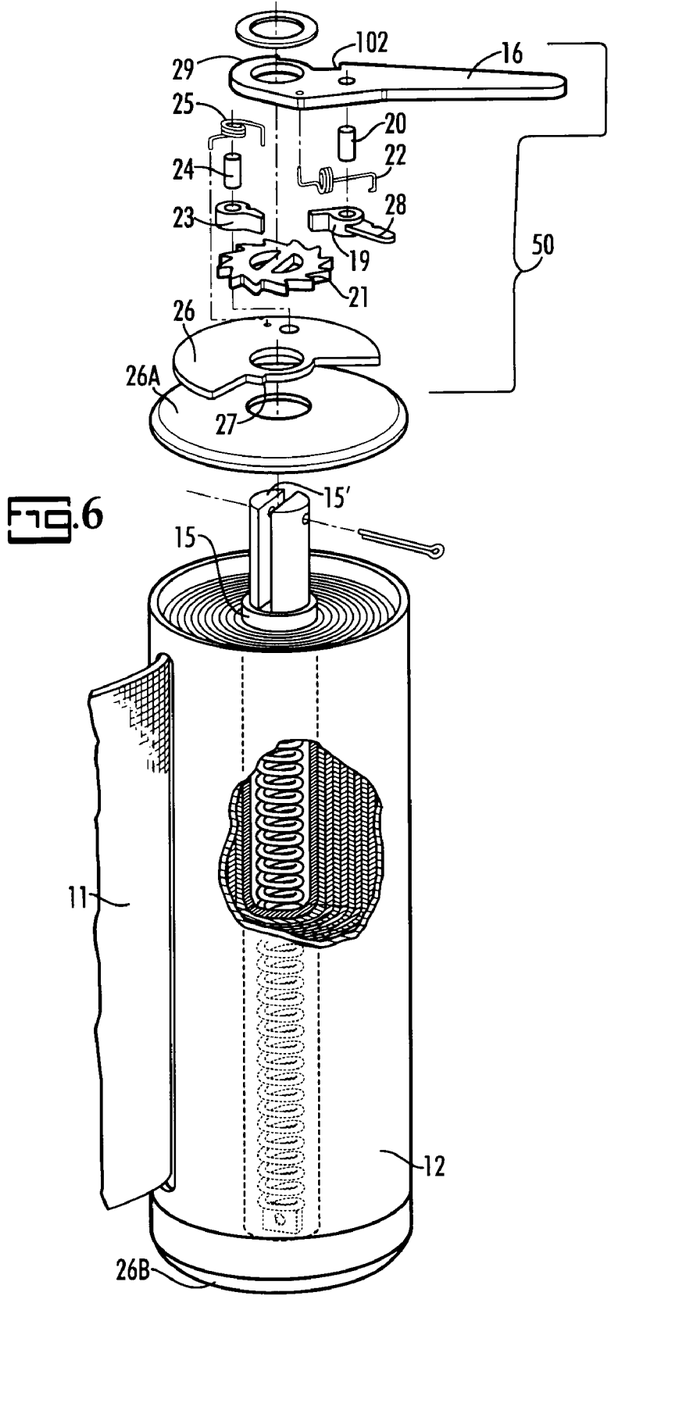
FIG. 6 is an exploded perspective of the carrier and its ratcheting mechanism with parts broken away for illustration purposes.

As shown in FIG. 6, a tensioning mechanism 50 provided on the upper end of the housing 12A is operably connected in torque transmitting relation to the spool 15 to retract the membrane 11 around the spool 15; the spool 15 being rotationally supported in aligned annular openings in upper and lower end plates 26A and 26B of the housing 12A. In a preferred embodiment, a coil spring 18, disposed within the hollow spool 15, has its lower end non-rotatably secured to the carrier and its upper end fixedly attached to the spool 15. Alternative means to rotatably bias the spool 15 include, but not limited to, a coil spring wound external to the spool 15 or a clock type spring wound external to the spool 15. The tensioning mechanism 50 includes a ratcheting lever 16. In the preferred embodiment of the tensioning mechanism 50, a ratcheting pawl 19 is connected to the ratcheting lever 16 by a pivot pin 20 and engages a ratchet wheel 21. A spring 22 biases the ratcheting pawl 19 to engage the ratchet wheel 21. Ratchet wheel 21 is fixedly attached to a vertically slotted upper end 51' of the spool 15. A latching pawl 23 is rotatably connected to a mounting plate 26 by a pin 24. A spring 25 biases the latching pawl 23 to engage the ratchet wheel 21. The mounting plate 26 is welded to an annular end plate 26A which in turn is secured as by welding to the upper end of the housing 12A of the carrier 12. The annular openings in the plates 26, 26A serve as bearings for the upper end of the spool 15 and an annular opening in the lower end plate 26B serves as a bearing for the lower end of the spool. Movement of the ratcheting lever 16 in one direction engages the ratcheting pawl 19 and ratchet wheel 21 thereby rotating the spool 15 and tensioning the membrane 11. A stop 27 engages the ratcheting pawl 19 preventing further movement of the ratcheting lever. Movement of the ratcheting lever 16 in the opposite direction engages the latching pawl 23 and ratchet wheel 21 allowing the ratchet wheel 21 to return to its original position without the corresponding movement of the spool 15.

Membrane tension is released by disengaging ratcheting pawl 19 from the ratchet wheel 21 by manually applying pressure to the ratcheting pawl lever 28. The ratcheting lever 16 is then rotated such that the ratcheting pawl 19 passes stop 27. The cammed surface 29 of the ratcheting lever 16 subsequently engages the latching pawl 23 thereby disengaging the latching pawl 23 from the ratchet wheel 21. This preferred sequence of disengagement of the ratcheting and latching pawls 19, 23 from the ratchet wheel 21 helps prevent unanticipated rotational acceleration of the ratcheting lever 16 and aids to prevent subsequent injury or merchandise damage.

Figure 7:
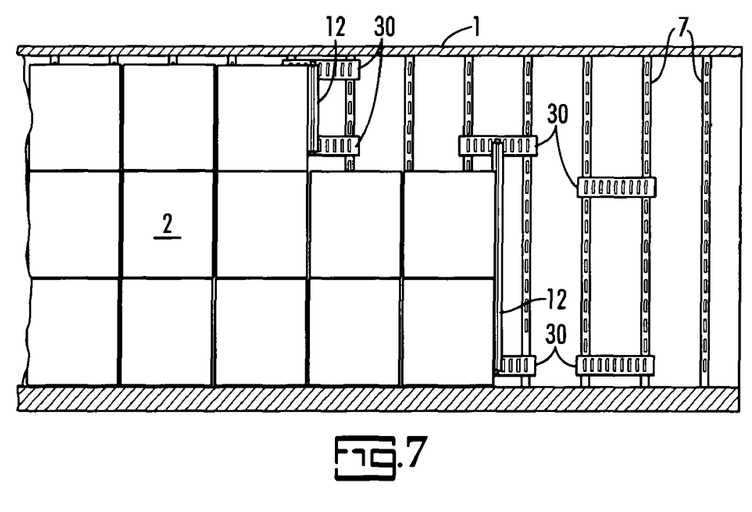
FIG. 7 is a cutaway lateral view of a semi-trailer side wall with vertical e-channels, releasably attachable horizontal adapters, and short and long variations of the cargo restraining apparatus.

In using the load restraining apparatus, the user releasably mounts the carrier 12 on one wall of the semi-trailer. This may be achieved by engaging the clips 14 into apertures 9 formed in mounting brackets, such as e-channels 7, 8, commonly found on semi-trailers 1. FIG. 7 shows a cutaway view of a trailer 1 having vertical e-channels 7 on which horizontal adapter brackets 30 are mounted FIG. 7 also shows a load restraining apparatus 111 of greater height with a membrane at least twice as wide as membrane 11.

Figure 8:
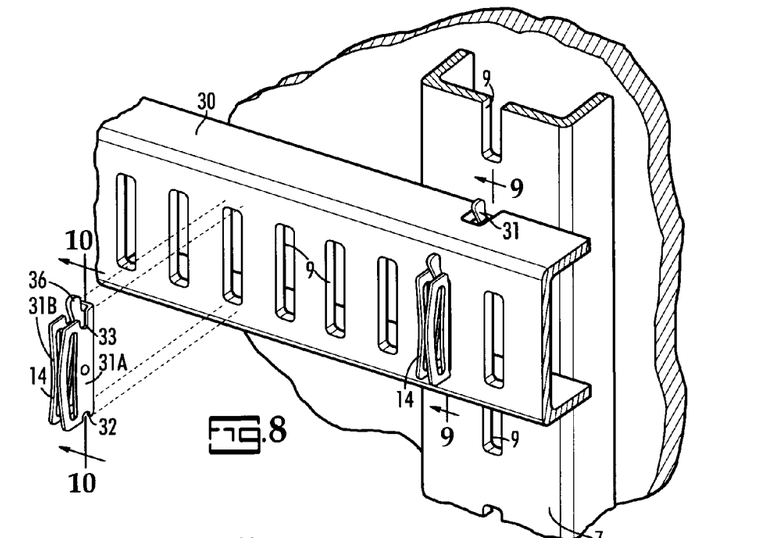
FIG. 8 is a partial perspective view of a releasably attachable horizontal adapter attached to a vertical e-channel.
Figure 9:
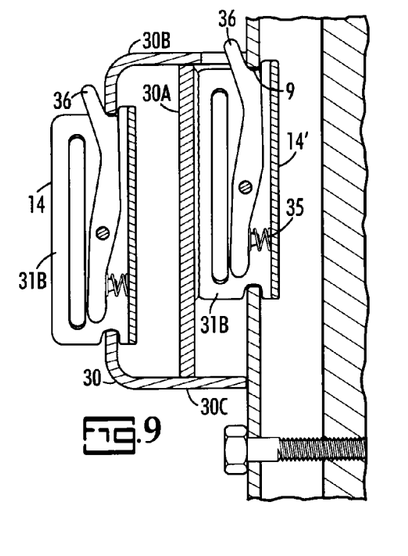
FIG. 9 is section taken on line 9-9 in FIG. 8 showing the internal releasable locking mechanism of the horizontal adapter and a clip.
Figure 10:
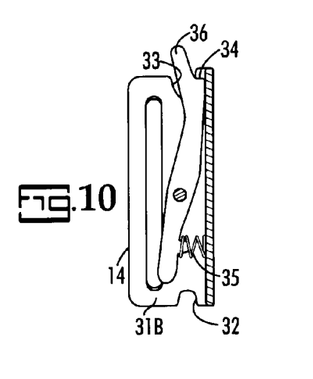
FIG. 10 is section taken on line 10-10 in FIG. 8 showing the internal releasable locking mechanism of a clip.

FIGS. 8 and 9 show a channel shaped horizontal adapter bracket 30 releasably mounted to an e-channel 7 by a releasable clip 14', which is of the same construction as clip 14, except its parallel side walls 31A, 31B are welded to a vertical bracket 30A welded in turn at its top and bottom to the flanges 30A and 30B of the bracket 30. In the embodiment shown in FIGS. 8, 9 and 10 the exterior surfaces of the clips 14, 14' roughly define rectangular prismatic shapes with two indentations 32, 33 in each of its two side walls 31A, 31B, respectively. The upper indentation 33 is slightly deeper than the lower indentation 32. A spring biased pivoted latch or locking lever 36 includes a mechanical stop 34, shown in FIGS. 9 and 10. The user inserts the upper indentation 33 in the e-channel slot 9 in the web of the bracket 30 with the lever pivoted to remove the stop 34 from alignment with the upper notch. The lower indentation 32 of the clip 31 then is inserted into the e-channel slot 9 and lowered. The pivot lever 36 is then released to place the stop 34 in the slot 9. Upward movement of the clip 14 is prevented by abutment of stop 34 against the upper edge of slot 9. A spring 35 biases the lever 36 to a latching position in which the stop 34 is in the e-channel slot 9, thereby locking the clip 14' to the e-channel 7. The protruding release lever 36 enables the user to engage it for removal and installation of the clip 14 or 14'. It should be understood that the adapter bracket 30 is attached to an adjacent e-channel in the same manner as illustrated in FIG. 9.

Figure 11:
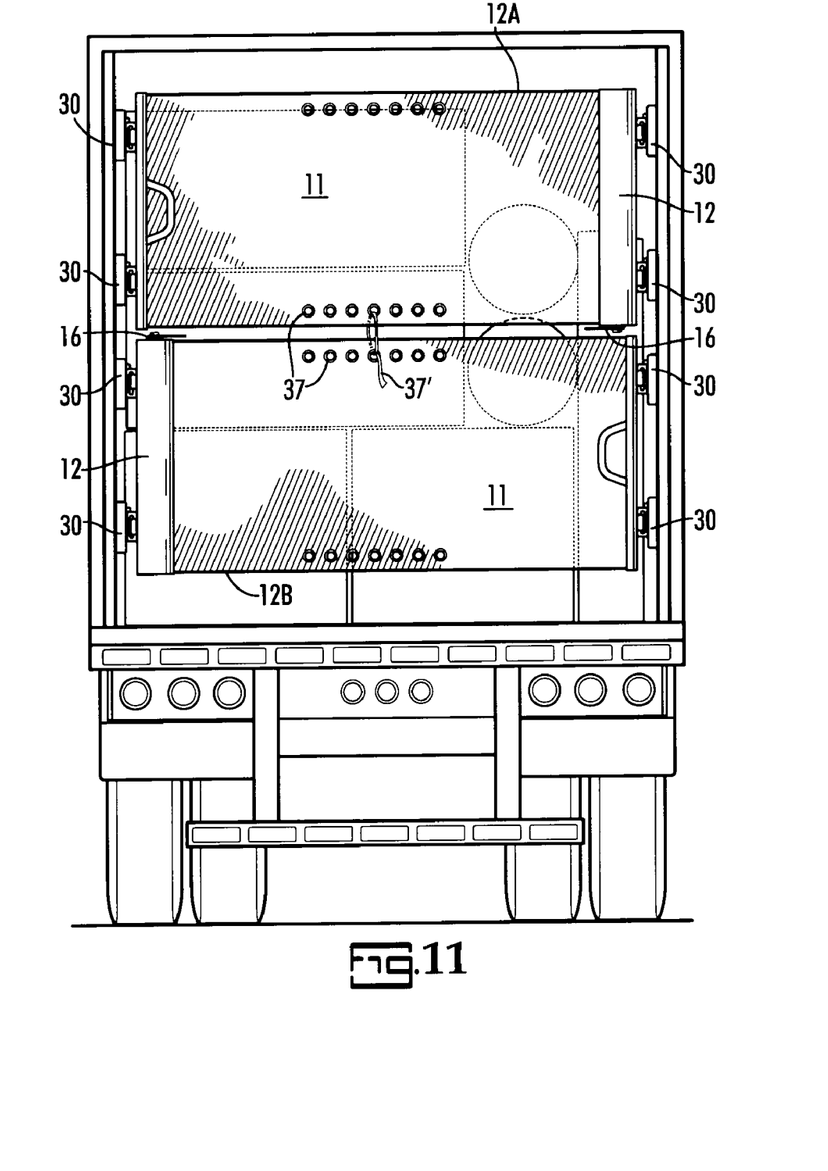
FIG. 11 is a cutaway lateral view of a semi-trailer with horizontally oriented e-channel adapters.

FIG. 11 shows two restraining apparatuses 12A and 12B positioned vertically adjacent to each other. The carriers 12 may be placed in either a normal upright position or an inverted position. Preferably when the carrier is placed in a high position, the carrier 12 is in an inverted position to allow easier access to the ratcheting handle 16. The high position of the membrane 11 keeps it in close proximity to the upper most articles being restrained. The carrier 12, and its tensioning mechanism 50, may also be mirrored resulting in a left handed carrier or a right handed carrier so as to enable placement of the left handed carrier on the left side of the semi-trailer with the lever in the upright position and the membrane close to the load to be restrained and placement of the right handed load lock on the right side of the semi-trailer with the lever in the upright position and the membrane close to the load to be restrained. A series of apertures 37 adjacent to the upper and lower edges of the membrane 11 allow placement of a tamper evident tag 37' between the two vertically adjacent membranes 11.

Figure 12A:
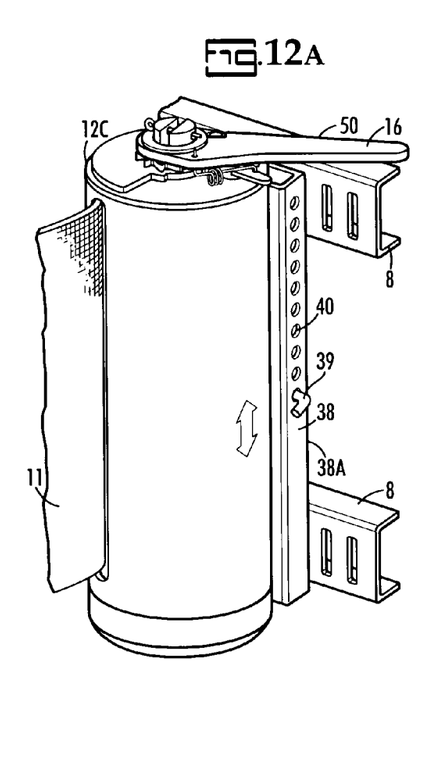
FIG. 12A is a perspective of an embodiment of the invention showing a carrier supported on a rotatable and translatable mounting bracket attached to a pair of horizontal adapters.
Figure 12B:
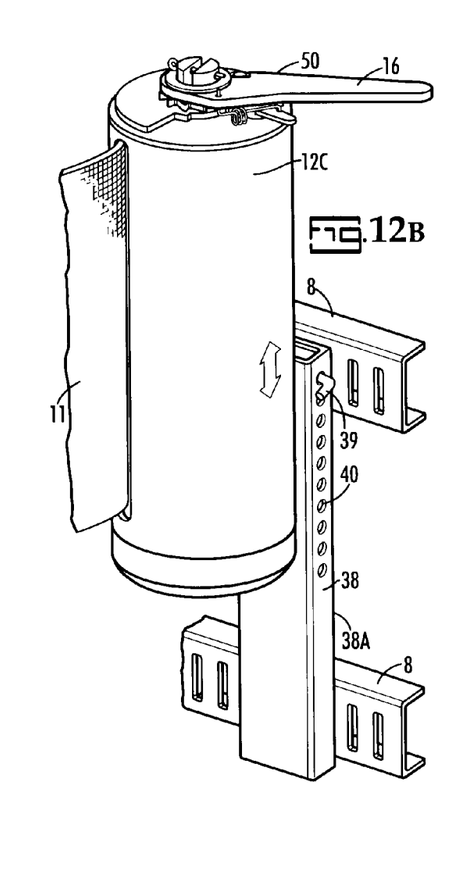
FIG. 12B shows the carrier raised on the mounting brackets.

An alternate embodiment of the invention, shown in FIGS. 12A, 12B, 13, 14 and 15, includes a mounting bracket 38 that permits the carrier 12C to rotate about a horizontal axis 42A of a pin 42 rigidly secured to the carrier 12C and allows vertical translation of the carrier 12C. The mounting bracket 38 has a rectangular section tubular shape with a vertical height longer than it's width or depth. This embodiment is advantageously used to achieve vertical height adjustment of the membrane 11 when the semi trailer is equipped with horizontal e-channels 8. This embodiment of the invention enables the membrane 11 to restrain articles positioned low in the trailer, or alternatively enables the membrane 11 to restrain articles positioned high in the trailer. The vertically adjusted position of the carrier 12C is effected by use of a lock pin 39 inserted through one of a series of vertically spaced apertures 40 located in the side of the mounting bracket 38. FIG. 12A shows the carrier 12C in a neutral or normal position, while FIG. 12B shows the carrier 12C in an extended or raised position. Two carriers 12C may be used, one high, the other low, to insure restraint of articles stacked the full height of the trailer. The carrier 12C may be mounted with the ratcheting lever 16 positioned on top, or may be mounted in an inverted position with the ratcheting lever 16 positioned at the bottom.

Figure 13:
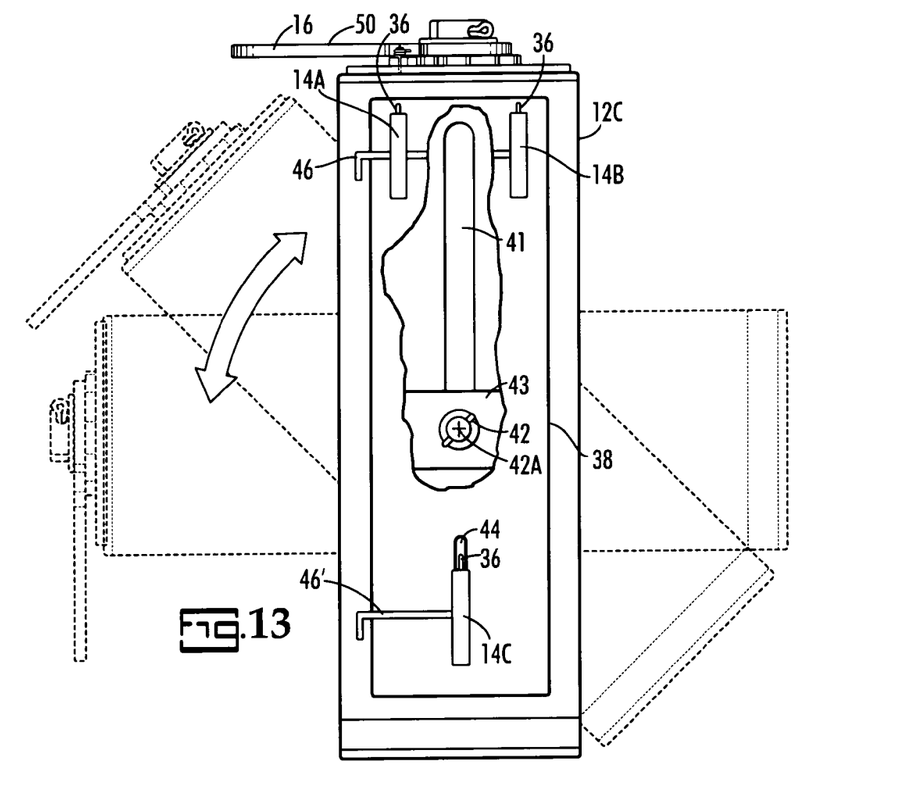
FIG. 13 is a rear view of the mounting bracket illustrating rotation about the translatable and rotatable joint with a partial cutaway showing the translatable and rotatable joint between the carrier and the mounting bracket.
Figure 14:
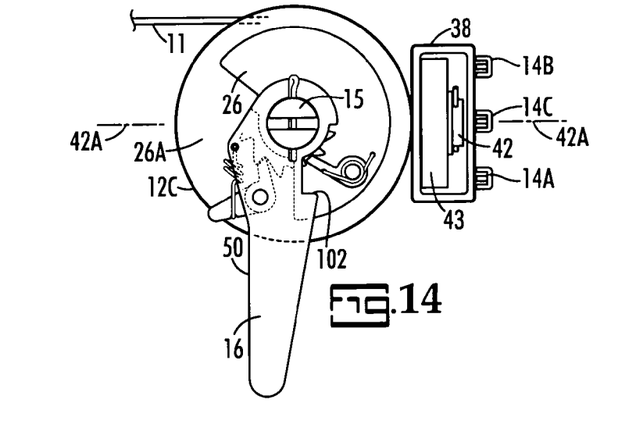
FIG. 14 is a top view of the carrier showing the ratcheting mechanism and the translatable and rotatable mounting bracket.

FIG. 13 shows the carrier 12C and the mounting bracket 38 with a part of the mounting bracket 38 broken away. The mounting bracket 38 includes a slot 41 through which a pin 42 passes. The pin 42 secures the carrier 12C to a slidable mounting block 43 received within the mounting bracket 38. The pin 42 is rotatably secured to the mounting block 43. Rotation of the carrier 12C permits adjustment of the membrane 11 to vertically secure articles within the semi-trailer 1 and to also accommodate articles that possess irregular shapes. The mounting block 43, is allowed to vertically translate within the mounting bracket 38 and its position relative to the mounting bracket 38 is established by insertion of the pin 39 through one of the openings 40 in the bracket 38 and into one of the openings 45 in the block 43. A plurality of clips 14A, 14B, 14C are attached to the rear of the mounting bracket 38. The upper clips 14A, 14B are positioned a sufficient distance apart so as to engage two adjacent slots 9 in the horizontal e-channel 30 simultaneously, or alternately engaging two slots so as to leave a third slot between them empty. The lower clip 14C is slidably attached to the mounting bracket 8 so as to adjust vertically relative thereto. Preferably the clip 14c is secured within a vertical slot 44 enabling the slidable connection. The slot 44 is of sufficient length to permit the carrier 12C and the mounting bracket 38 to be attached to a variety of horizontal e-channels 8 or brackets 30 spaced at various vertical distances from one another. FIG. 14 shows a top view of the carrier 12C with its tensioning mechanism and the mounting bracket 38.

Figure 15:
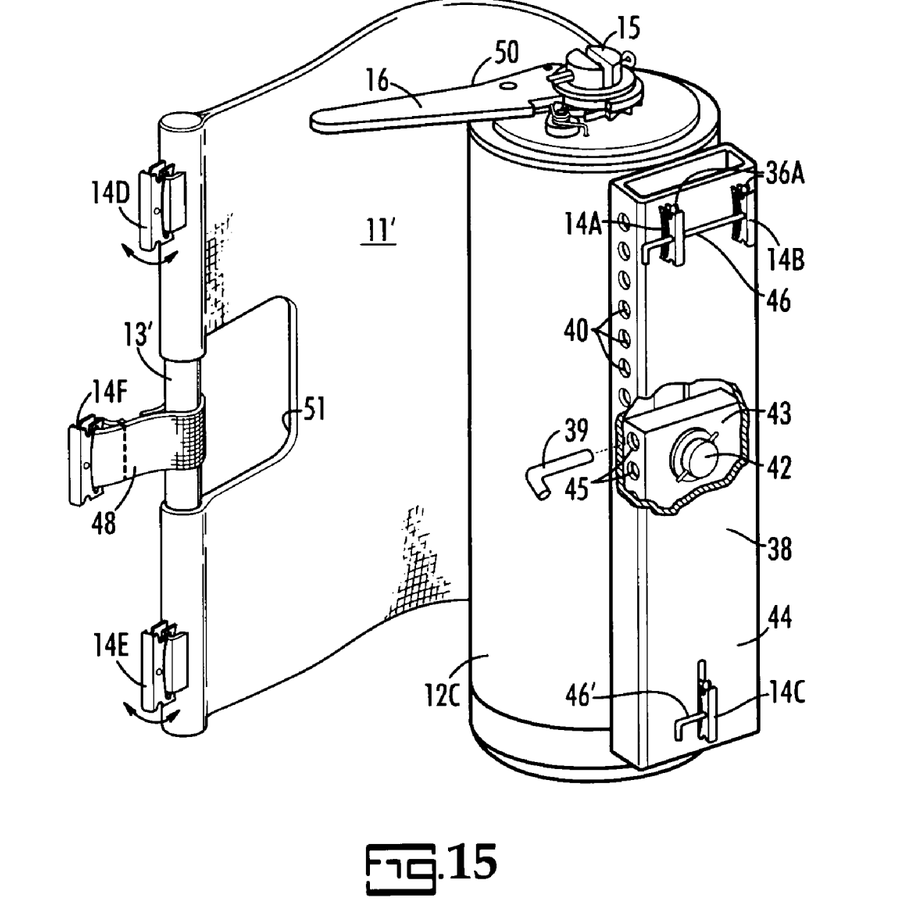
FIG. 15 is a perspective of the membrane and carrier with a cutaway showing the rotation and slide joint and a translation locking pin.

FIG. 15 is a perspective rear view of the carrier 12C with a partial cutaway of the mounting bracket 38. The mounting block 43 is vertically secured to the mounting bracket 38 by a lock pin 39. The mounting block 43 possesses a plurality of apertures 45 adapted to receive a lock pin 39. The lock pin 39 prevents vertical translation of the carrier 12C when simultaneously received within one of the series of apertures 40 in the mounting bracket 38 and one of the apertures 45 in the mounting block 43. The locking levers 36A of the upper clips 14A, 14B are rigidly secured to a shared shaft 46 which extends beyond one lateral side of the mounting bracket 38 terminating in a lever arm 47 which when turned causes release rotation of the release levers 36 of the clips 14A, 14B. A similar shaft 46' is provided for the low clip 14C. A flexible inelastic the strap 48 is connected to the membrane 11' by wrapping around the grab bar 13' at the aperature 51 and securely fastening to itself. A clip 14F is fastened to the distal end of the strap 48. Clips 14D, 14F are rotatably attached to the grab bar 13' near opposite ends to enable the grab bar 13' to be attached vertical or horizontal e-channels 7 or 8. The clips 14D, 14E may also be slidably attached to the grab bar 13' to enable attachment to a variety of horizontal e-channel brackets spaced apart various distances.

What is claimed is:

1. A load restraining apparatus for use in an interior of a semi-trailer comprising:
   a membrane carrier with an exterior surface approximately defining a surface of revolution about a first vertical axis, said carrier being releasably attachable to the interior of the semi-trailer, and including
      a bottom end cap possessing an aperture with a central axis aligned with said first vertical axis,
      an upper end cap having an aperture with a central axis aligned with said first vertical axis;
      a spool aligned with said first vertical axis and having ends received within said apertures of said end caps and substantially extending the length of said membrane carrier;
      a slot in said exterior surface of said membrane carrier running substantially the length of said carrier;
      an inelastic flexible load restraining fabric membrane possessing a first end secured to said spool and a second end releasably attachable to the interior of a semi-trailer;
      said spool being rotationally biased to retract said flexible membrane; and
      a ratcheting mechanism on said carrier operable to tension said membrane.

2. A load restraining apparatus for releasable connection to and between cargo interior side walls having parallel rows of equally spaced elongated slots, comprising:
   a membrane carrier supporting a spool for rotation about a vertical axis;
   a flexible elongated membrane having first and second opposite ends sufficiently distanced apart to allow said membrane to span between said interior side walls;

said first of said opposite ends of said membrane being secured to said spool;
a rotatably biased return mechanism connected to said spool;
a first clip connected to said second of said opposite ends of said membrane releaseably attached to one of said elongated slots in one of said interior walls; and
another clip connected to said membrane carrier to releasably fasten said membrane carrier to the other of said interior walls;
a grab bar fastened to said second of said opposite ends of said membrane, said first clip being secured rotatably to said grab bar.

3. A load restraining apparatus adapted for releasable connection to and between cargo container interior side walls having parallel rows of equally spaced elongated slots, comprising:
a membrane carrier supporting a spool for rotation about a vertical axis,
a flexible elongated membrane having first and second opposite ends sufficiently distanced apart to allow said membrane to span the interior width of said cargo container interior side walls,
said first end of said membrane being secured to said spool,
a rotatably biased return mechanism connected to said spool;
a first one clip connected to said second end of said membrane adapted to releasably attach to one of said elongated slots in one of said interior walls; and
another clip connected to said membrane carrier and adapted to releasably fasten said membrane carrier to the other of said interior walls; and
a mounting bracket rotatably attached to said membrane carrier wherein said another clip is connected to said mounting bracket.

4. A load restraining apparatus adapted for releasable connection to and between cargo container interior side walls having parallel rows of equally spaced elongated slots, comprising:
a membrane carrier supporting a spool for rotation about a vertical axis,
a flexible elongated membrane having first and second opposite ends sufficiently distanced apart to allow said membrane to span the interior width of said cargo container interior side walls,
said first end of said membrane being secured to said spool,
a rotatably biased return mechanism connected to said spool;
a first one clip connected to said second end of said membrane adapted to releasably attach to one of said elongated slots in one of said interior walls; and
another clip connected to said membrane carrier and adapted to releasably fasten said membrane carrier to the other of said interior walls; and
wherein said membrane defines a plurality of apertures in proximity to upper and lower edges of said membrane, said apertures being adapted to permit a tamper-evident tag to be affixed thereto.

5. A load restraining apparatus adapted for releasable connection to and between cargo container interior side walls having parallel rows of equally spaced elongated slots, comprising:
a membrane carrier supporting a spool for rotation about a vertical axis,
a flexible elongated membrane having first and second opposite ends sufficiently distanced apart to allow said membrane to span the interior width of said cargo container interior side walls,
said first end of said membrane being secured to said spool,
a rotatably biased return mechanism connected to said spool;
a first one clip connected to said second end of said membrane adapted to releasably attach to one of said elongate slots in one of said interior walls; and
another clip connected to said membrane carrier and adapted to releasably fasten said membrane carrier to the other of said interior walls; and
a mounting bracket slidably attached to said membrane carrier allowing vertical translation thereof, and wherein said another clip is attached to said mounting bracket.

6. The apparatus of claim 5 including
a pivot member having a second axis connecting said membrane carrier to said mounting bracket;
a linear slide member having a length oriented such that its length is parallel with said vertical axis and;
a mounting block slidably attached to said linear slide member and said block having an aperture, with a central axis, aligned with said second axis in which said pivot member is received.

7. The apparatus of claim 6 including a second another clip in which said another clip and said second another clip are attached in proximity to an upper edge of said mounting bracket and a third another clip is slidably mounted adjacent the bottom edge of said mounting bracket so as to permit said third another clip to translate vertically.

8. The apparatus of claim 7 in which said another clip and said second another clip are simultaneously releasable.

9. The apparatus of claim 7 wherein said mounting block is releasably lockable to said slide member.

10. The apparatus of claim 9 having a two ended strap with a first end and a second end, said second end attached to a third clip which is releasably attachable to said one of said interior walls of said cargo container.

* * * * *